United States Patent
Hurley et al.

(10) Patent No.: US 7,409,127 B1
(45) Date of Patent: Aug. 5, 2008

(54) FIBER OPTIC ASSEMBLIES SUITABLE FOR ADDING NODES TO A COMMUNICATION NETWORK

(75) Inventors: William C. Hurley, Hickory, NC (US);
Eric R. Logan, Hickory, NC (US);
David A. Seddon, Hickory, NC (US);
Kenneth A. Chauvin, Frisco, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/906,029

(22) Filed: Sep. 28, 2007

(51) Int. Cl.
*G02B 6/44* (2006.01)
*G02B 6/36* (2006.01)

(52) U.S. Cl. .................. 385/101; 385/53; 385/102; 385/106

(58) Field of Classification Search ............ 385/53–56, 385/58, 59, 75, 101, 102, 106; 439/577
See application file for complete search history.

(56) References Cited

U.S. PATENT DOCUMENTS

| | | | |
|---|---|---|---|
| 5,189,718 A | 2/1993 | Barrett et al. | 385/101 |
| 5,242,315 A * | 9/1993 | O'Dea | 439/577 |
| 5,778,122 A | 7/1998 | Giebel et al. | 385/55 |
| 5,911,019 A | 6/1999 | Cohen | 385/24 |
| RE36,592 E | 2/2000 | Giebel et al. | 385/100 |
| RE37,028 E | 1/2001 | Cooke et al. | 385/112 |
| 6,385,366 B1 | 5/2002 | Lin | 385/24 |
| 7,016,575 B2 | 3/2006 | So | 385/48 |

OTHER PUBLICATIONS

Corning Cable Systems Product Specification, "Optifit Assembly", Copyright Mar. 2002, 3 pages.

* cited by examiner

*Primary Examiner*—Frank G Font
*Assistant Examiner*—Michael P Mooney
(74) *Attorney, Agent, or Firm*—Michael E. Carroll, Jr.

(57) ABSTRACT

Disclosed are fiber optic assemblies for adding additional nodes to a communication network. The fiber optic assemblies include a plurality of optical fibers and a plurality of electrical conductors for transmitting power with a protective sheath covering at least a portion of the same. The fiber optic assembly also includes an optical stub fitting assembly having a rigid housing attached to a optical portion of the composite cable, thereby furcating one or more optical fibers of the fiber optic cable into one or more optical fiber legs. One or more of the optical fiber legs may include one or more optical connector attached thereto. Optionally, the fiber optic assembly may further include a coaxial adapter for transmitting power.

20 Claims, 7 Drawing Sheets

FIBER OPTIC ASSEMBLIES SUITABLE FOR ADDING NODES TO A COMMUNICATION NETWORK

FIELD OF THE INVENTION

The present invention relates generally to fiber optic assemblies. More particularly, the present invention relates to fiber optic assemblies suitable for adding nodes to an existing communication network such as a cable television network.

BACKGROUND OF THE INVENTION

Communications networks are used to transport a variety of signals such as voice, video, data and the like. As communication applications rapidly evolve subscribers require ever increasing bandwidth to receive the desired content. However, most existing communication networks have limits on the bandwidth they can provide to subscribers. This bandwidth limitation is especially true with communication networks still using copper cables. It is possible to install a new communication network that routes optical fibers to the subscriber that dramatically increases the bandwidth that the communication network can provide, but many service providers desire to increase the bandwidth capacity of existing communication networks. Moreover, there are challenges for increasing the bandwidth on existing networks such as planning, deployment, ultimate bandwidth constraints, cost and the like. Additionally, the service provider must balance the cost to upgrade the network with the anticipated lifespan for the upgraded communication network.

For instance, some communication networks use a hybrid network of fiber optic cables and copper cables for delivering content to subscribers. One such hybrid network is typically deployed in cable television communication networks. In these cable television hybrid communication networks, the relatively high bandwidth capacity of optical fibers is used for transmitting signals to a network node, and thereafter copper cables are used for transmitting data from the network node to the subscribers. However, there are still limits on the bandwidth that these hybrid networks can provide along with other restraints that may limit performance. As the demand for bandwidth increases, service providers will need quick, easy and reliable solutions for increasing the bandwidth to subscribers on these hybrid communication networks. The present invention addresses the need for providing increased bandwidth to subscribers by providing fiber optic assemblies that allow a quick, easy, and reliable installation into existing hybrid communication networks.

SUMMARY OF THE INVENTION

The present invention is directed to fiber optic assemblies that allow quick, easy, and reliable installation for adding bandwidth to communication networks. For instance, a suitable fiber optic assembly for adding nodes to an existing communication network includes a plurality of optical fibers and a plurality of electrical conductors for transmitting power having portions thereof in a protective sheath. Suitable assemblies may also include an optical stub fitting assembly having a rigid housing having a threaded end, a plug, and a nut, wherein the optical stub fitting assembly is attached to a portion of the fiber optic assembly, thereby furcating one or more optical fibers of the fiber optic cable into one or more optical fiber legs with at least one optical connector attached to one of the optical fiber legs.

Another aspect of the present invention is directed to a fiber optic assembly for adding nodes to an existing communication network having a fiber optic cable and an electrical cable at least partially disposed within a protective sheath. The fiber optic assembly also includes an optical stub fitting assembly attached to a portion of the fiber optic cable, thereby furcating one or more optical fibers of the fiber optic cable into one or more optical fiber legs with at least one optical connector being attached to one of the optical fiber legs. Additionally, the size of the electrical conductors of the electrical cable can be tailored for the distance and power output to the new node of the communication network.

Still another aspect of the present invention is directed to a fiber optic assembly for adding nodes to an existing communication network having a fiber optic cable and an electrical cable at least partially disposed within a protective sheath. The assembly has at least one water-swellable component disposed radially outward of the fiber optic cable for blocking the migration of water. The fiber optic assembly also includes an optical stub fitting assembly and a coaxial adapter. The optical stub fitting assembly is attached to a portion of the fiber optic cable, thereby furcating one or more optical fibers of the fiber optic cable into one or more optical fiber legs with at least one optical connector being attached to one of the optical fiber legs and the coaxial adapter is attached to the electrical cable for transmitting power.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principals and operations of the invention.

DETAILED DESCRIPTION OF THE INVENTION

Figure 1:
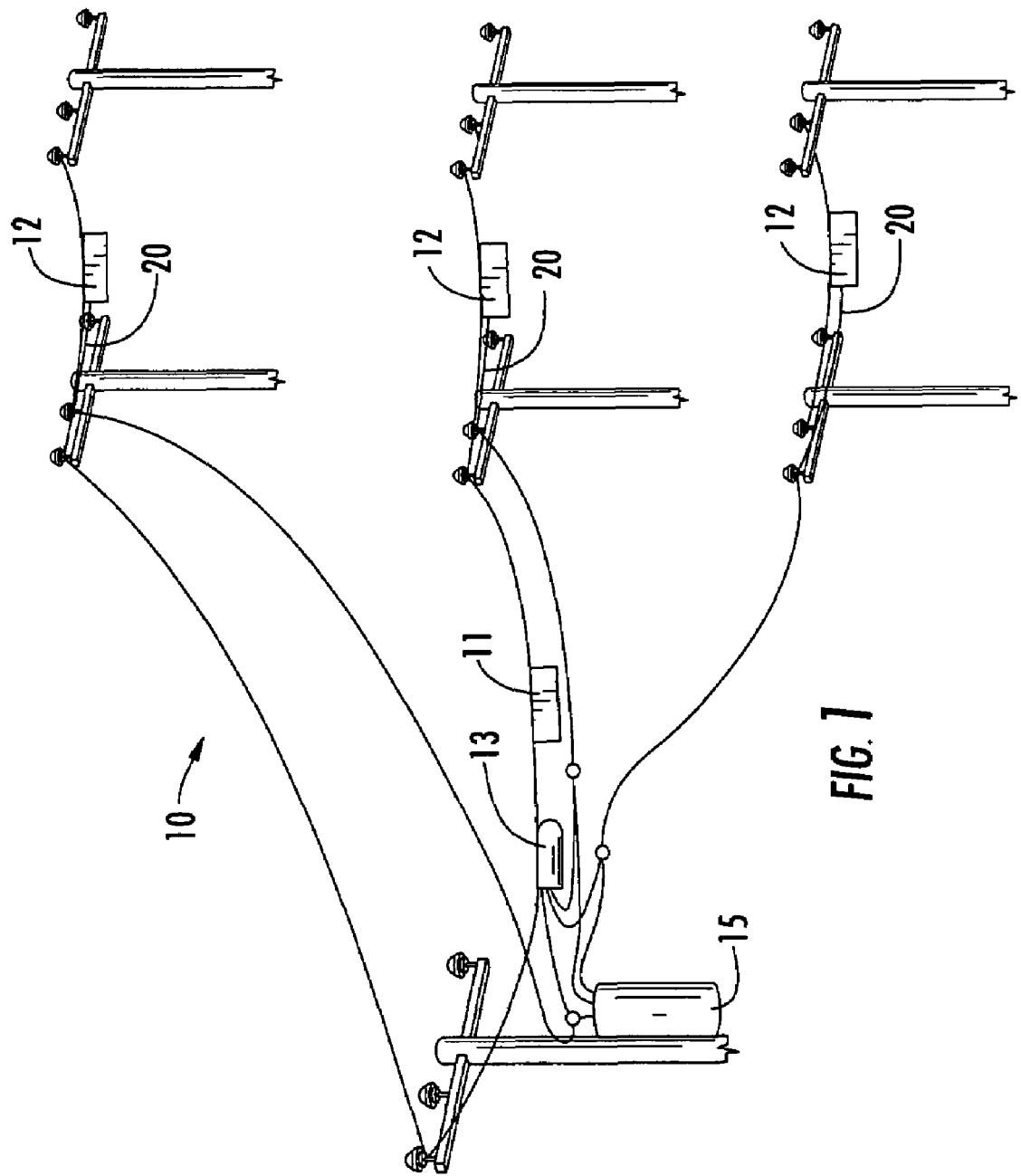
FIG. 1 is a schematic representation of a node splitting configuration for a portion of a communication network where nodes are being added to the network using fiber optic assemblies according to the present invention.

Reference will now be made in detail to the present preferred embodiments of the invention, examples of which are illustrated in the accompanying drawings. Whenever possible, the same reference numerals will be used throughout the drawings to refer to the same or like parts. FIG. 1 is a schematic representation of a portion of a communication network 10 having an existing node 11 and three new nodes 12 that are added to the existing network using a plurality of fiber optic assemblies 20 according to the concepts of the present invention. Communication network 10 could be any suitable network such as a cable television network or the like. As shown, communication network 10 uses three fiber optic assemblies 20 for adding three new nodes 12 to the existing network. Respective fiber optic assemblies 20 are routed from the desired locations for respective new nodes 12 toward the existing network to tap electrical power and optical signals therefrom such as located near existing node 11. As shown, fiber optic assembly 20 splits (as represented by the solid dots) because portions of the same are routed to different portions of the existing communication network 10. Specifically, an electrical portion of each fiber optic assembly 20 taps into existing power supply 15 for powering each respective new node 12. Likewise, a portion of each fiber optic assembly 20 is optically connected to the existing network such as spliced with an existing splice closure 13 as shown. Simply stated, the fiber optic assemblies of the present invention allow a relatively quick, easy, and reliable addition of new nodes 12 to the existing network by providing the delivery of optical communications along with electrical power for new nodes 12. Consequently, the fiber optic assemblies of the present invention allow increased bandwidth to the subscribers of communication network 10, thereby allowing the service provider the ability to improve and/or add services with limited disruption to the communication network.

Specifically, adding new nodes 11 reduces the number of subscribers served by each node of the network, thereby increasing the bandwidth available for providing services to the subscribers. By way of example, if existing node 11 serves five-hundred subscribers in the area, the addition of three new nodes 12 as depicted in FIG. 1 greatly reduces the number of subscribers served per node. Simply stated, after adding three new nodes 11, each of the four nodes (e.g., the one existing node 11 plus three new nodes 12) serves one-hundred and twenty-five subscribers, instead of having one existing node 11 serving five-hundred subscribers. Consequently, the bandwidth the communication network 10 is able to deliver to subscribers is dramatically increased.

Figure 2:
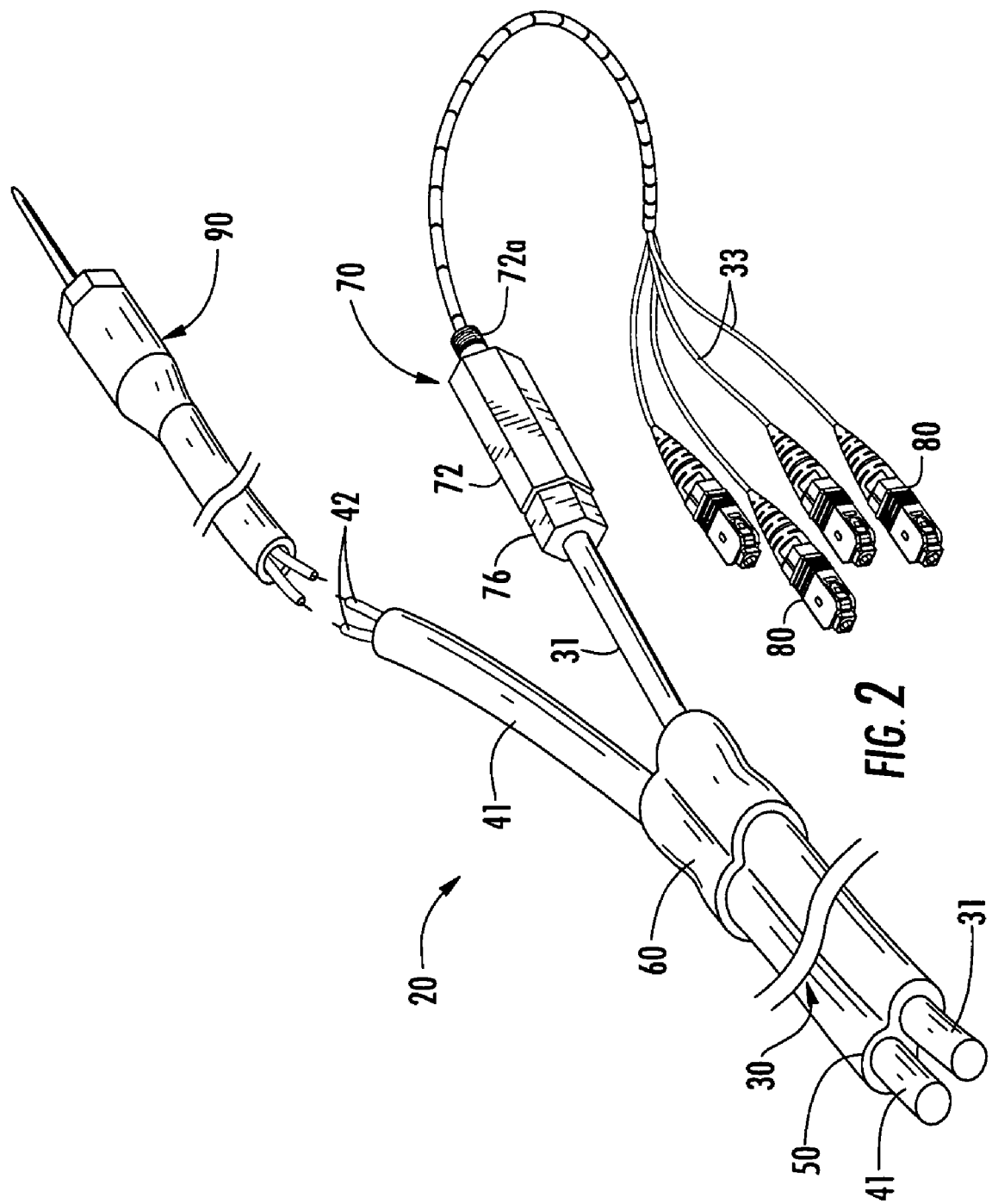
FIG. 2 is a perspective view of a portion of an explanatory fiber optic assembly according to the present invention suitable for use in the communication network of FIG. 1.

FIG. 2 is a perspective view of a portion of one explanatory fiber optic assembly 20 suitable for adding nodes to communication network 10, thereby increasing the ability to deliver greater bandwidth to the subscribers. Fiber optic assembly 20 includes a composite cable 30 having a protective sheath 50, an optional heat shrink tubing 60, an optical stub fitting assembly 70, at least one optical connector 80, and an optional coaxial adapter 90. Heat shrink tubing 60 is optionally attached to composite cable 30 near the location where an optical portion 31 splits from an electrical portion 41 for providing environmental protection and/or inhibiting tearing of protective sheath 50 beyond the intended splitting location. As shown, optical stub fitting assembly 70 is attached to a portion of fiber optic cable 30 for furcating one or more optical fibers 32 of composite cable 30 into one or more optical fiber legs 33. Optical connectors 80 are attached to respective optical fiber legs (not numbered), thereby providing fast and reliable optical connectorization for fiber optic assembly 20 into the existing communication network. Additionally, coaxial adapter 90 may be used on one or both ends of composite cable 30 such as for tapping the existing power supply 15 of the communication network for transmitting power along the electrical conductors to new nodes 12 of communication network 10 or for powering the new node. Coaxial adapter 90 includes a long pin (not numbered) for insertion into a cooperating mating receptacle to make the electrical connection. As depicted, coaxial adapter 90 is not attached to fiber optic assembly 20, but if it were electrical conductors 42 are electrically connected to complementary electrical conductors of the same. In a similar manner, optical stub fitting assembly 70 may be used near one or both ends of fiber optic assembly 20.

Figure 3:
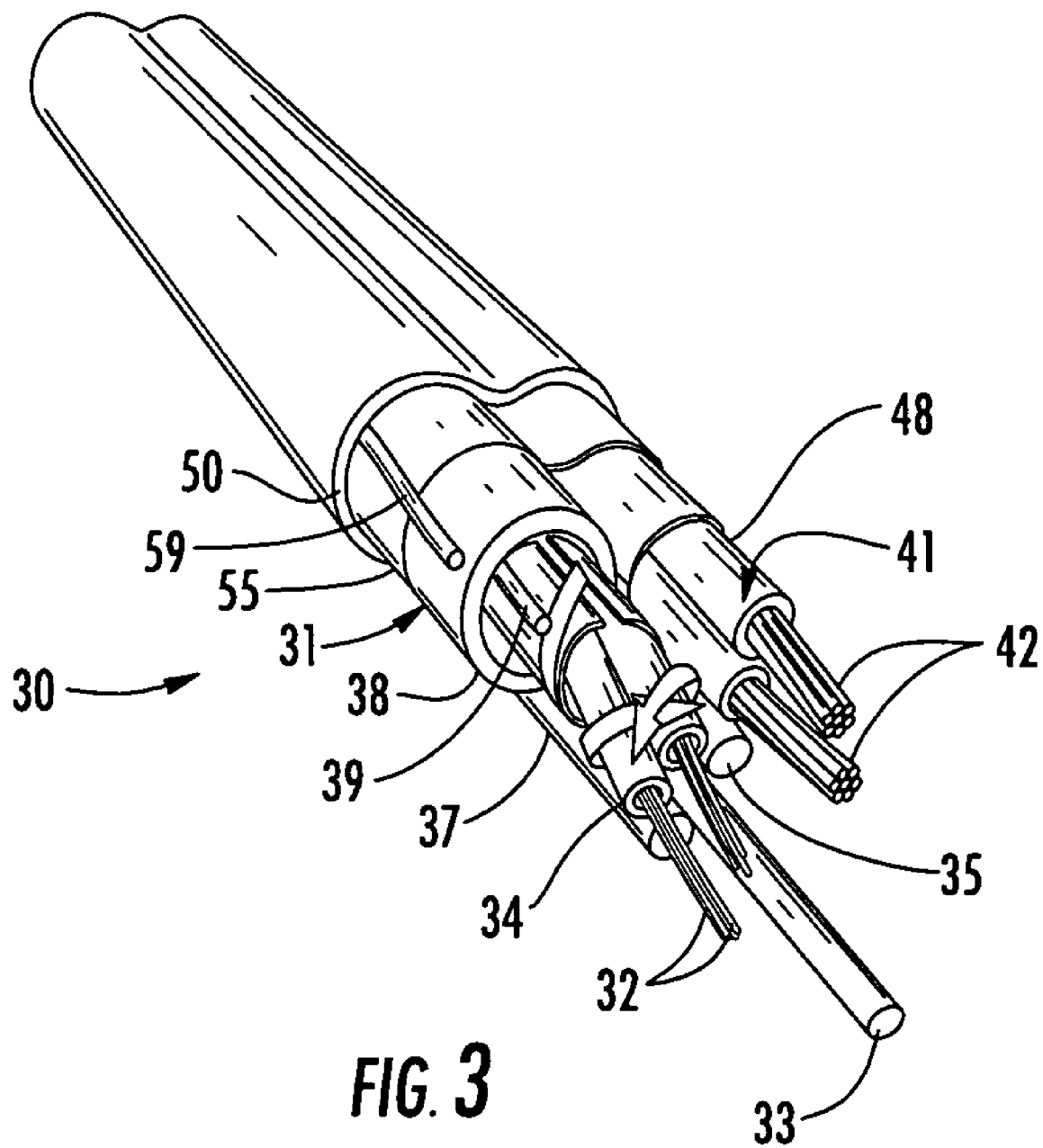
FIG. 3 is a perspective view of the composite cable shown in the fiber optic assembly of FIG. 2.

FIG. 3 is a cross-sectional view of the composite cable 30 used in fiber optic assembly 20 of FIG. 2. Composite cable 30 has optical portion 31 configured as a fiber optic cable (not numbered) having a plurality of optical fibers 32 for transmitting optical signals and electrical portion 41 is configured as an electrical cable (not numbered) having a plurality of electrical conductors 42 for transmitting power with both cables disposed within protective sheath 50 for a length of fiber optic assembly 20. Simply stated, composite cable 30 uses a distinct fiber optic cable and a distinct electrical cable within a portion of protective sheath 50. As used herein, the term "cable" refers to a structure that has its own individual cable jacket which surrounds a portion of all of the similar elements (i.e., the electrical cable jacket surrounds a portion of all of the electrical conductors or the fiber optic cable jacket surrounds a portion of all of the optical fibers). Illustratively, the fiber optic cable has a fiber optic cable jacket 38 that surrounds a portion of all of the optical fibers 32; likewise, the electrical cable has an electrical cable jacket 48 that surrounds a portion of all of the electrical conductors 42. On the other hand, protective sheath 50 covers and protects both the optical portion and the electrical portion of composite cable 30. However, other embodiments of the composite cable used in assemblies of the invention need not use an individual fiber optic cable and/or an individual electrical cable. For instance, the composite cable could include electrical portion that does not include an individual electrical cable jacket disposed about a portion of all of the electrical conductors within the protective sheath (i.e., electrical cable jacket 48 is omitted), but instead have an insulation layer and are partially disposed within the protective sheath. In a similar manner, the optical fibers need not include a fiber optic cable jacket.

Composite cable 30 optionally includes one or more cable components disposed radially outward of either the fiber optic cable or the electrical cable. For instance, composite cable 30 has one or more water-swellable components 55 radially outward of the cables for inhibiting the migration of water along the same. For instance, a water-swellable tape is disposed about the fiber optic cable and one or more water-swellable yarns are disposed about the electrical cable for blocking the migration of water between the cables and protective sheath 50. Likewise, composite cable 30 may includes one or more strength members such as fiberglass, aramid, glass-reinforced plastic (GRP) or the like within protective sheath 50 for providing tensile strength. Additionally, composite cable 30 includes one or more ripcords 59 within protective sheath 50, thereby allowing the craft to easily tear a portion of protective sheath 50 if desired.

As shown, the optical portion 31 of composite cable 30 is a stranded loose tube fiber optic cable configuration, but other composite cables may use other configurations or constructions for the optical portion of composite cable 30. The fiber optic cable includes a cable core with a central member 33 having one or more buffer tubes 34 stranded therearound along with one or more filler rods 35. Fiber optic cable 31 may also includes one or more water-swellable components 37 for blocking the migration of water within fiber optic cable 31, one or more strength members (not visible) for providing tensile strength, and a ripcord 39 for aiding the craft in tearing fiber optic cable jacket 38 when access is desired. Electrical portion 41 is cable capable of transmitting a predetermined power (i.e., voltage and current) over a desired distance for adding nodes to the existing network. By way of example, electrical portion 41 is suitable for adding a node up to 3,000 feet or more away from the existing node of the communication network using a typical 90 volt power supply such as used in a cable television network. To handle this power requirement, electrical conductors 42 should have a gauge of 16 AWG or larger electrical capacity size such as 12 AWG or 10 AWG for handling the power transmission necessary for the given communication network. As shown, electrical conductors 42 also each include an insulating material (not numbered) therearound for preventing the electrical shorts. Moreover, electrical conductors 42 can have any suitable structure such as solid wire or stranded wire and/or be formed from any suitable conductive material such as copper, aluminum, or the like. Additionally, the concepts of the invention are suitable with other communication networks such as those using different power supply voltages.

Figure 4:
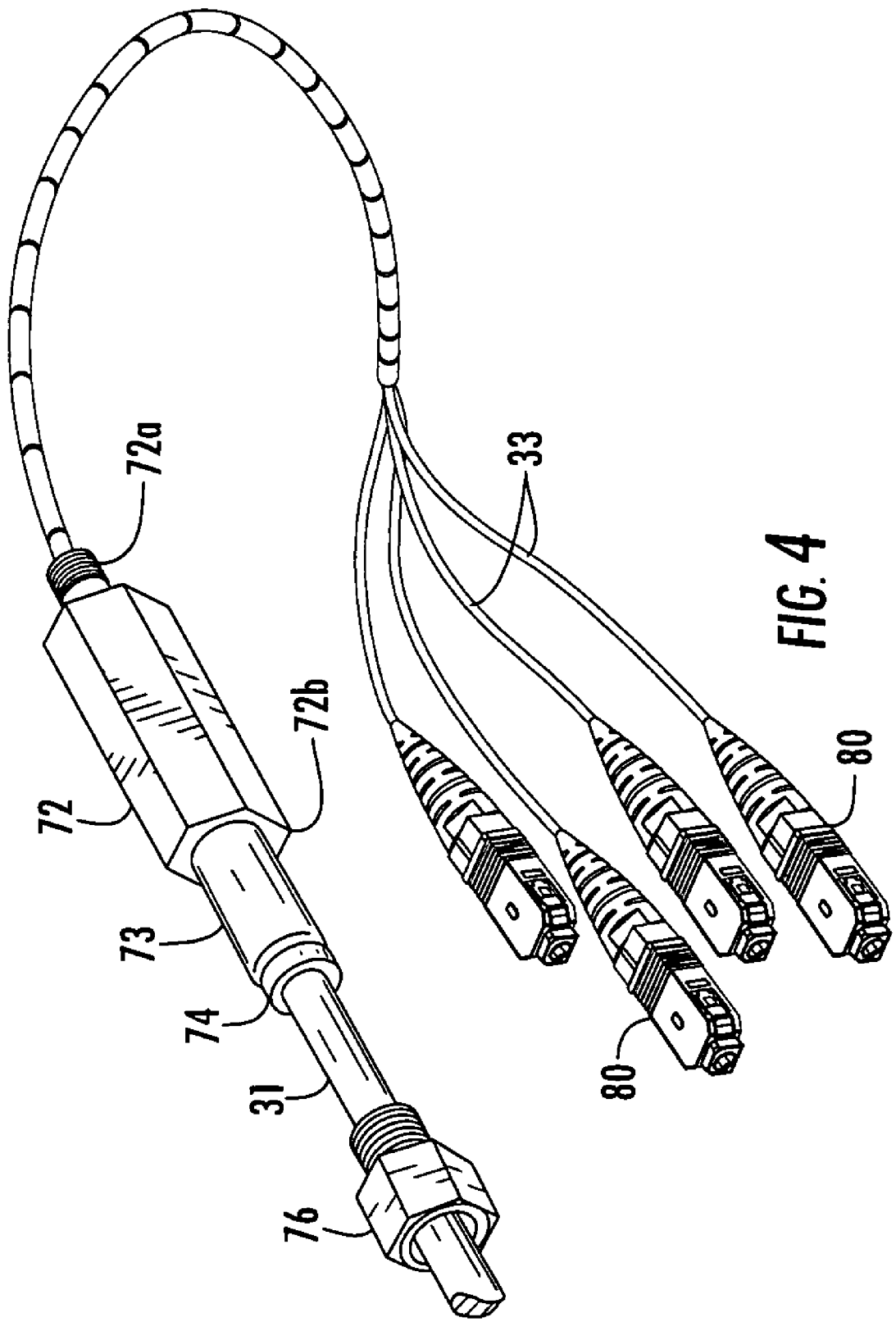
FIG. 4 is a partially assembled view of the optical fiber stub fitting shown in the fiber optic assembly of FIG. 2.

FIG. 4 is a partially assembled view of the optical fiber stub fitting 70 shown in FIG. 2. Optical stub fitting assembly 70 is attached to the optical portion 31 of composite cable 30 for furcating one or more optical fibers 32 into one or more optical fiber legs 83. Optical stub fitting assembly 70 includes a rigid housing 72, a sleeve 73, a plug 74, and a nut 76. As shown, the components of optical stub fitting assembly 70 are threaded onto optical portion 31, then a plurality of single-fiber optical connectors 80 may be attached to each optical fiber leg 83. Rigid housing 72 has a first end 72a that is threaded with a male end and a second end 72b that has a threaded female end for attaching nut 76. Typically, the portion within sleeve 73 is potted or otherwise provides mechanical and/or environmental protection to the optical portion 31 that passes therethrough. Additionally, nut 76 may include a sealing element (not visible) such as grommet, o-ring, washer, or the like for environmental protection. Rigid housing 72 and is formed from a suitable material such as a metal like stainless steel, thereby providing a robust structure that can withstand the rigors of an outdoor environment. As depicted, each individual optical fiber passes through sleeve 73 and the remainder is enclosed in furcation tubing (not numbered) for protecting and identifying each optical fiber. For instance, each furcation tubing uses a different color for identification purposes.

Figure 5:
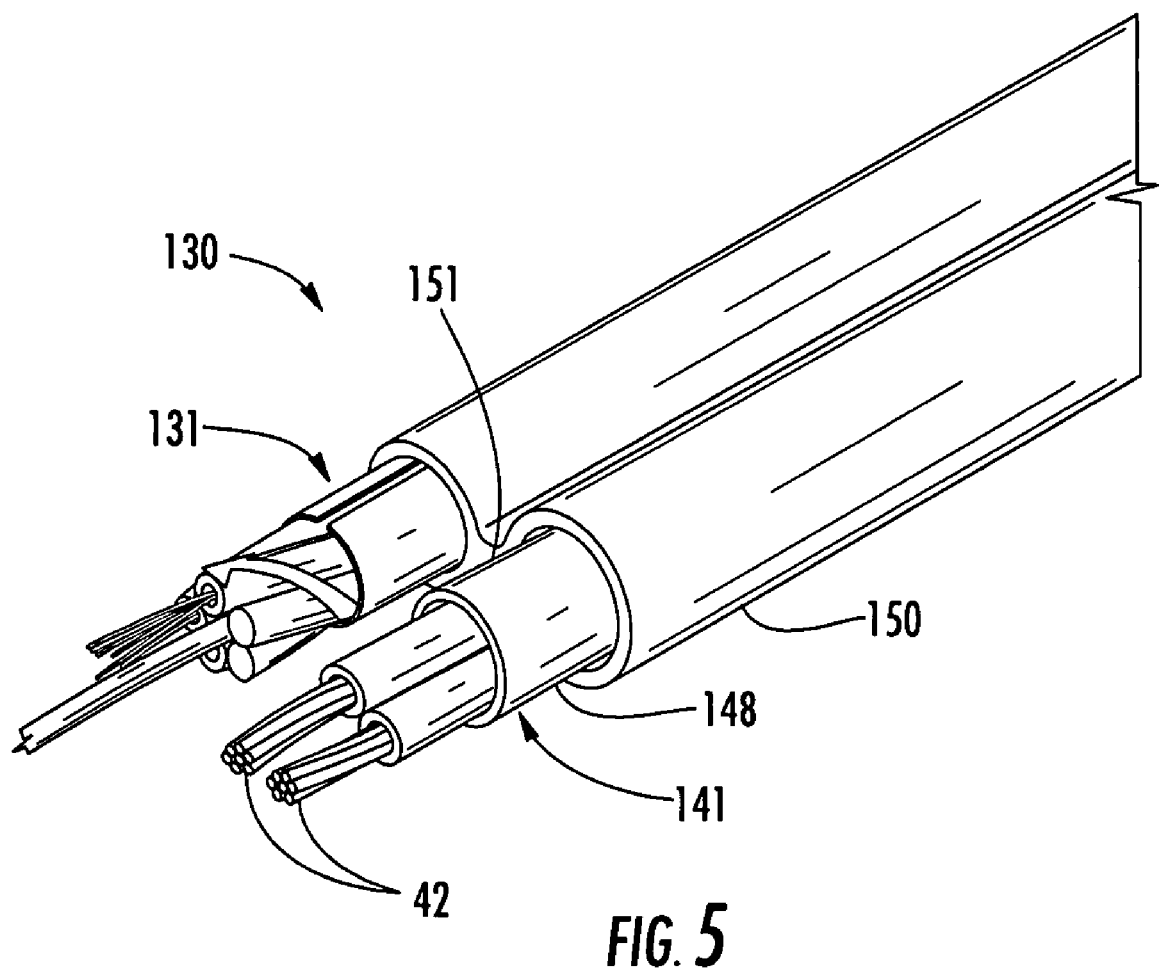
FIG. 5 is a perspective view of another composite cable suitable for use in the fiber optic assemblies according to the present invention.

FIG. 5 is a cross-sectional view of another composite cable 130 suitable for use in fiber optic assemblies of the present invention. Like composite cable 30, composite cable 130 includes a fiber optic portion 131 and an electrical portion 141 at least partially disposed in a protective sheath 150. Protective sheath 150 has a figure-eight configuration. In other words, protective sheath 150 has separate lobes for fiber optic portion 131 and electrical portion 141, which are connected by a web portion 151 that is frangible (i.e, tearable) for separating the fiber optic portion 131 from the electrical portion 141. Additionally, after tearing of web portion 151 the fiber optic portion 131 and electrical portion 141 remain protected by respective portions of protective sheath 150, thereby advantageously allowing entry into one portion without opening the protective sheath of the other portion. As shown, optical portion 131 has a stranded tube configuration like that used in composite cable 30, except that it does not include a fiber optic cable jacket since protective sheath 150 provides environmental protection. Electrical portion 141, which is similar to electrical cable 41, includes electrical conductors 42 that are at least partially disposed within an electrical cable jacket 148. In other embodiments, the electrical cable jacket 148 may be omitted.

Figure 6:
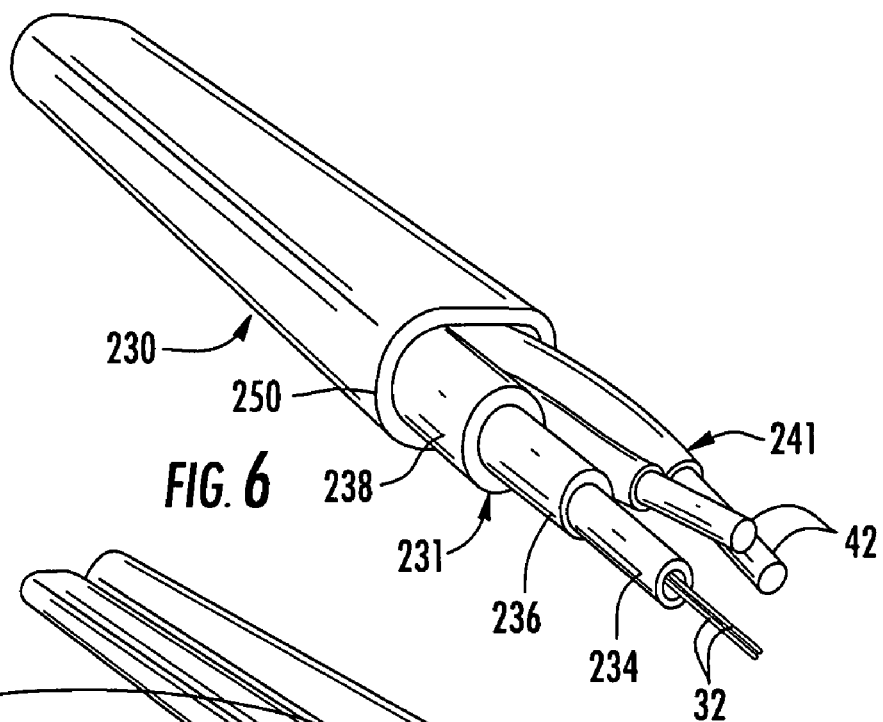
FIG. 6 is a perspective view of another composite cable suitable for use in fiber optic assemblies according to the present invention suitable for adding nodes to the communication network of FIG. 1.

FIG. 6 is a cross-sectional view of another composite cable 230 suitable for use in fiber optic assemblies of the present invention. Composite cable 230 includes a fiber optic cable 231 and an electrical portion 241 at least partially disposed within a protective sheath 250. As depicted, fiber optic cable 231 has a central tube construction with optical fibers 32 disposed in a buffer tube 234, a plurality of strength members 236, and a fiber optic cable jacket 238. Electrical portion 241 includes electrical conductors 42 that are at least partially disposed within protective sheath 250. In other words, electrical portion 241 does not have an electrical cable jacket 148, but instead relies on protective sheath 250 for environmental protection.

Figure 7:
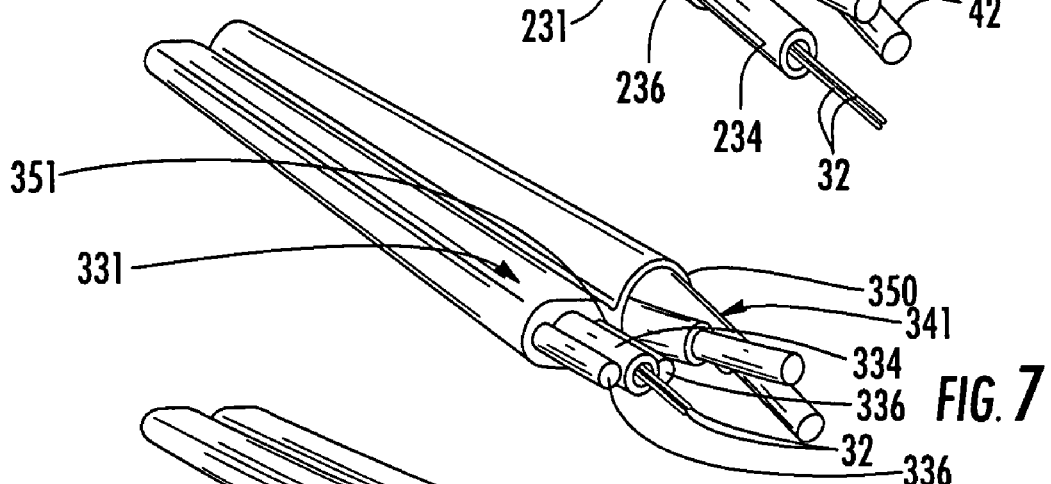
FIG. 7 is a perspective view of another composite cable suitable for use in fiber optic assemblies according to the present invention.

FIG. 7 is a cross-sectional view of another composite cable 330 suitable for use in fiber optic assemblies of the present invention. Composite cable 330 includes a fiber optic portion 331 and an electrical portion 341 at least partially disposed in a protective sheath 350. In this embodiment, protective sheath 350 has a figure-eight configuration with a web 351 that is frangible for separating the two portions. Moreover, neither the fiber optic portion 331, nor the electrical portion 341, of composite cable 330 includes a cable jacket. Unlike the figure-eight configuration of FIG. 5, fiber optic portion 331 has a generally flat profile. As shown, the generally flat profile of fiber optic portion 331 has a tube 334 with optical fibers 32 therein and two outboard strength members 336 on either side of tube 334. Electrical portion 341 includes electrical conductors 42 that are at least partially disposed within protective sheath 350 without the electrical cable jacket.

Figure 8:
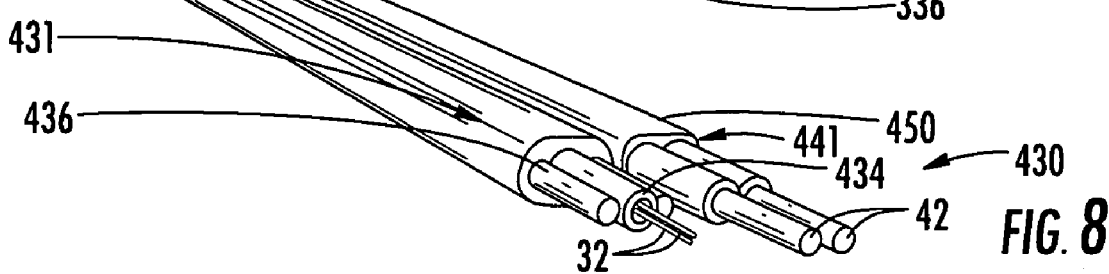
FIG. 8 is a perspective view of another fiber optic assembly according to the present invention suitable for use in the communication network of FIG. 1.

FIG. 8 is a cross-sectional view of another composite cable 430 suitable for use in fiber optic assemblies of the present invention. Composite cable 430 is similar to composite cable 330 since it includes a fiber optic portion 431 and an electrical portion 441 at least partially disposed in a protective sheath 450 having a figure-eight configuration. Moreover, fiber optic portion 431 has a generally flat profile like the fiber optic portion 331 of composite cable 330 with a pair of outboard strength members 436 disposed on either side of a tube 434. Electrical portion 441 includes electrical conductors 42 that are at least partially disposed within protective sheath 450 without the electrical cable jacket. However, electrical conductors 42 are arranged in a generally linear array, thereby imparting a generally flat shape to composite cable 430.

Figure 9:
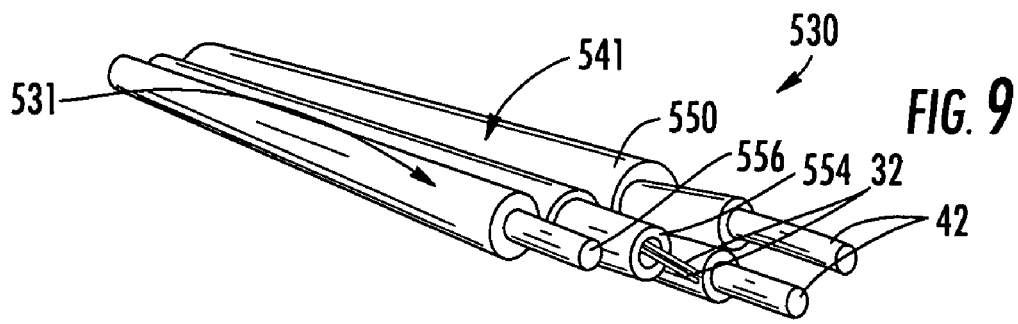
FIG. 9 is a perspective view of another fiber optic assembly according to the present invention suitable for use in the communication network of FIG. 1.

FIG. 9 is a cross-sectional view of another composite cable 530 suitable for use in fiber optic assemblies of the present invention. Composite cable 530 includes a fiber optic portion 531 and an electrical portion 541 at least partially disposed in a protective sheath 550 having a multi-lobe configuration. In other words, protective sheath 550 has a first web (not visible) and a second web (not visible), thereby dividing and allowing the separation of composite cable 530 into three portions. Specifically, first web 553 connects a portion having a tube 554 with optical fibers 32 with a portion having a strength member 556, and second web 555 connects the portion having tube 554 with a portion having electrical connectors 42. Consequently, each portion of composite cable may be separated for use as desired. For instance, since strength member 556 can be separated it can be inserted into a pressure clamp for securing one or more ends in an aerial applications.

Figure 10:
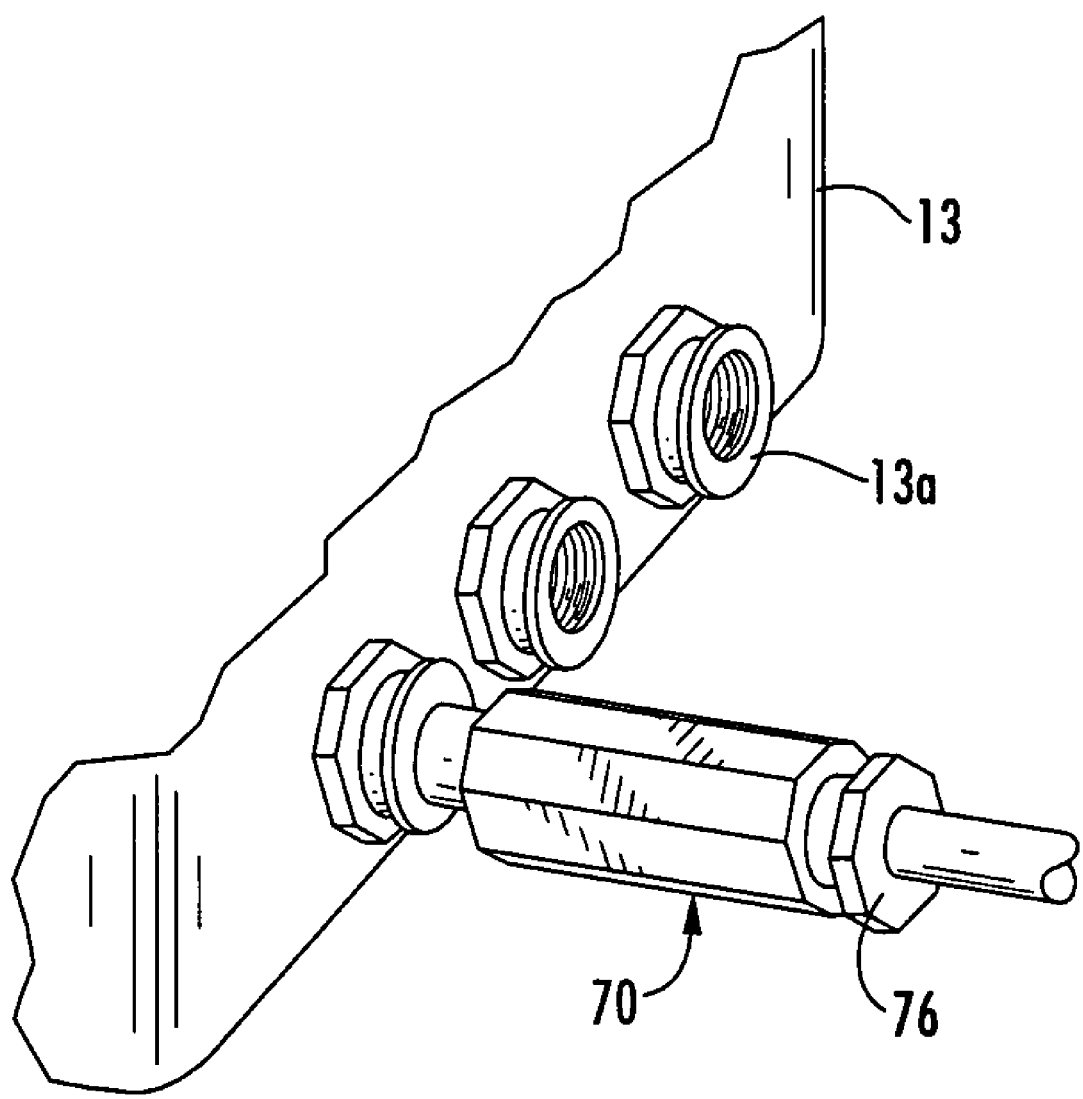
FIG. 10 is a perspective view a portion of the fiber optic assembly being attached to the closure for the communication network of FIG. 1.

FIG. 10 is a perspective view a portion of fiber optic assembly 20 being attached to closure 13 that forms a portion of communication network 10. As shown, closure 13 has a plurality of ports 13a for receiving a portion of optical stub fitting assembly 70. Specifically, the optical connectors 80 and optical fiber legs 83 are routed into closure 13 through one of the ports 13a and then first end 72a of optical stub fitting assembly 70 is secured to closure 13 at port 13a. Likewise, other end of fiber optic assembly 20 could have a similar structure for optical connectivity. Additionally, the optical portion of fiber optic assembly 20 could connect to the communication network 10 in other suitable configurations. Moreover, fiber optic assemblies may use other suitable types of optical connectors such as mutli-fiber connectors such as MT, MTP, MPO, or other single-fiber connectors such as ST, SC, FC, and LC alone or in combination with other types of connectors.

Many modifications and other embodiments of the present invention, within the scope of the claims will be apparent to those skilled in the art. For instance, the concepts of the present invention can be used with any suitable composite cable designs and/or optical stub fitting assemblies. Thus, it is intended that this invention covers these modifications and embodiments as well those also apparent to those skilled in the art.

We claim:

1. A fiber optic assembly for adding nodes to an existing communication network comprising:
    a plurality of optical fibers therein;
    a plurality of electrical conductors for transmitting power;
    a protective sheath, the protective sheath covering at least a portion of the plurality of optical fibers and at least a portion of the electrical conductors;
    an optical stub fitting assembly, the optical stub fitting assembly including a rigid housing having a threaded end, a plug, and a nut, wherein the optical stub fitting assembly is a portion of the fiber optic assembly, thereby furcating one or more optical fibers of the fiber optic cable into one or more optical fiber legs; and
    at least one optical connector, the at least one optical connector being attached to one of the optical fiber legs.

2. The fiber optic assembly of claim 1, the electrical conductors having a gauge of 16 AWG or larger electrical capacity for the electrical conductors.

3. The fiber optic assembly of claim 1, the fiber optic assembly further including a coaxial adapter for transmitting power.

4. The fiber optic assembly of claim 1, the fiber optic assembly further including at least one ripcord for removing the protective sheath.

5. The fiber optic assembly of claim 1, the fiber optic assembly further including at least one water-swellable component within the protective sheath.

6. The fiber optic assembly of claim 1, the optical fiber legs including a furcation tubing for protecting the optical fibers therein.

7. The fiber optic assembly of claim 1, the fiber optic assembly further including at least one water-swellable component and a strength member within the protective sheath.

8. The fiber optic assembly of claim 1, the protective sheath having at least one web that is frangible.

9. A fiber optic assembly for adding nodes to an existing communication network comprising:
    a fiber optic cable having a plurality of optical fibers therein;
    an electrical cable for transmitting power, the electrical cable having two conductive wires with a gauge of 16 AWG or larger electrical capacity for the two conductive wires;
    a protective sheath, the protective sheath covering at least a portion of the fiber optic cable and at least a portion of the electrical cable;
    an optical stub fitting assembly, the optical stub fitting assembly including a rigid housing having a threaded end, a plug, and a nut, wherein the optical stub fitting assembly is attached to a portion of the fiber optic cable, thereby furcating one or more optical fibers of the fiber optic cable into one or more optical fiber legs; and
    at least one optical connector, the at least one optical connector being attached to one of the optical fiber legs.

10. The fiber optic assembly of claim 9, further including a coaxial adapter for transmitting power.

11. The fiber optic assembly of claim 9, the fiber optic assembly further including at least one ripcord disposed radially outward of the fiber optic cable for removing the protective sheath.

12. The fiber optic assembly of claim 9, the fiber optic assembly further including at least one water-swellable component disposed radially outward of the fiber optic cable.

13. The fiber optic assembly of claim 9, the optical fiber legs including a furcation tubing for protecting the optical fibers therein.

14. The fiber optic assembly of claim 9, the fiber optic assembly further including at least one water-swellable component and a strength member disposed radially outward of the fiber optic cable.

15. The fiber optic assembly of claim 9, the protective sheath having at least one web that is frangible.

16. A fiber optic assembly for adding nodes to an existing communication network comprising:
    a fiber optic cable having a plurality of optical fibers therein;
    an electrical cable for transmitting power, the electrical cable having two conductive wires with a gauge of 16 AWG or larger electrical capacity for the two conductive wires;
    a protective sheath, the protective sheath covering at least a portion of the fiber optic cable and at least a portion of the electrical cable;
    at least one water-swellable component, the at least one water-swellable component being disposed radially outward of the fiber optic cable;
    an optical stub fitting assembly, the optical stub fitting assembly including a rigid housing having a threaded end, a plug, and a nut, wherein the optical stub fitting assembly is attached to a portion of the fiber optic cable, thereby furcating one or more optical fibers of the fiber optic cable into one or more optical fiber legs;
    at least one optical connector, the at least one optical connector being attached to one of the optical fiber legs; and
    a coaxial adapter, the coaxial adapter attached to the electrical cable for transmitting power.

17. The fiber optic assembly of claim 16, the fiber optic assembly further including at least one ripcord disposed radially outward of the fiber optic cable for removing the protective sheath.

18. The fiber optic assembly of claim 16, the optical fiber legs including a furcation tubing for protecting the optical fibers therein.

19. The fiber optic assembly of claim 16, the fiber optic assembly further including at least one strength member disposed radially outward of the fiber optic cable.

20. The fiber optic assembly of claim 16, the protective sheath having at least one web that is frangible.

* * * * *